(12) United States Patent
Zhang et al.

(10) Patent No.: US 11,287,557 B2
(45) Date of Patent: Mar. 29, 2022

(54) BACKLIGHT MODULE AND LIQUID CRYSTAL DISPLAY

(71) Applicant: WUHAN CHINA STAR OPTOELECTRONICS TECHNOLOGY CO., LTD, Hubei (CN)

(72) Inventors: Peng Zhang, Hubei (CN); Guanghui Liu, Hubei (CN); Chao Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/769,609

(22) PCT Filed: May 9, 2019

(86) PCT No.: PCT/CN2019/086222
§ 371 (c)(1),
(2) Date: Jun. 4, 2020

(87) PCT Pub. No.: WO2020/191868
PCT Pub. Date: Oct. 1, 2020

(65) Prior Publication Data
US 2021/0072449 A1 Mar. 11, 2021

(30) Foreign Application Priority Data
Mar. 27, 2019 (CN) .......................... 201910235305.3

(51) Int. Cl.
*F21V 8/00* (2006.01)
*G02F 1/1345* (2006.01)

(52) U.S. Cl.
CPC ......... *G02B 6/0021* (2013.01); *G02B 6/0088* (2013.01); *G02F 1/1345* (2013.01)

(58) Field of Classification Search
CPC .... G02B 6/0021; G02B 6/0088; G02F 1/1345
See application file for complete search history.

(56) References Cited

U.S. PATENT DOCUMENTS

| 2006/0203515 | A1 | 9/2006 | Fujikawa et al. | |
| 2015/0098043 | A1 | 4/2015 | Matsumoto | |
| 2017/0254945 | A1* | 9/2017 | You | G02B 6/0088 |
| 2017/0307808 | A1* | 10/2017 | Lee | G02B 6/0088 |
| 2018/0011374 | A1* | 1/2018 | Baek | G02B 6/0078 |

FOREIGN PATENT DOCUMENTS

| CN | 1831613 A | 9/2006 |
| CN | 107894676 A | 4/2018 |
| CN | 108663861 A | 10/2018 |
| JP | 2015072794 A | 4/2015 |

* cited by examiner

*Primary Examiner* — Kevin Quarterman
(74) *Attorney, Agent, or Firm* — Mark M. Friedman

(57) ABSTRACT

A backlight module and a liquid crystal display are provided. The backlight module realizes a narrow border of the backlight module by arranging a light source between a first protrusion portion of a support part and a light incident surface of a light guide plate. The backlight module cooperates with the liquid crystal display panel having a second protrusion portion and second notches of a stepped area, and a flexible printed circuit board passes through the second notches of the liquid crystal display panel and the first notches of the backlight module.

20 Claims, 5 Drawing Sheets

BACKLIGHT MODULE AND LIQUID CRYSTAL DISPLAY

FIELD OF INVENTION

The present disclosure relates to the field of display technologies, and more particularly to a backlight module and a liquid crystal display.

BACKGROUND OF INVENTION

With the development of liquid crystal display technologies, especially the development of full screen technologies, a need to narrow a lower frame of a backlight unit (BLU) of a display device to increase a screen ratio of a display area is becoming more and more obvious.

Therefore, there is a need to provide a technical solution to realize a narrow lower frame of a backlight module to improve a screen ratio of a display area of a liquid crystal display.

SUMMARY OF INVENTION

An object of the present disclosure is to provide a backlight module and a liquid crystal display. The backlight module has a narrow lower frame and is beneficial to the liquid crystal display to further achieve a narrow frame and a high screen ratio.

To solve the above technical problem, an embodiment of the present disclosure provides a backlight module. The backlight module includes a support part, a light guide plate positioned in the support part, and a light source. An end of the support part has two first notches and a first protrusion portion, the two first notches are respectively positioned at two sides of the first protrusion portion, a light incident surface of the light guide plate is disposed adjacent to a side surface of the first protrusion portion, a light emitting surface of the light source is attached to the light incident surface, and the light incident surface is disposed opposite to the first protrusion portion.

In an embodiment of the present disclosure, the light incident surface is enclosed to form a recessed notch.

In an embodiment of the present disclosure, the recessed notch is trapezoidal.

In an embodiment of the present disclosure, the light incident surface includes a first light incident surface, a second light incident surface, and an intermediate light incident surface connecting the first light incident surface and the second light incident surface, the first light incident surface and the second light incident surface are oppositely disposed, the intermediate light incident surface is perpendicular to a plane of the light guide plate and parallel to a direction in which the first notch points to the first protrusion portion, an angle between the first light incident surface and the intermediate light incident surface ranges between greater than or equal to 135 degrees and less than 180 degrees, and an angle between the second light incident surface and the intermediate light incident surface ranges between greater than or equal to 135 degrees and less than 180 degrees.

In an embodiment of the present disclosure, the angle between the first light incident surface and the intermediate light incident surface is equal to the angle between the second light incident surface and the intermediate light incident surface.

In an embodiment of the present disclosure, a length of the recessed notch adjacent to a first side of the first protrusion portion along a first direction is equal to a length of the first protrusion portion adjacent to a second side of the recessed notch along the first direction, and the first direction is a direction in which the first notch points to the first protrusion portion.

In an embodiment of the present disclosure, a ratio of a length of the first protrusion portion along the first direction to a vertical distance of two opposite sides of the support part along the first direction ranges between 0.5 and 0.99.

In an embodiment of the present disclosure, the first protrusion portion is an inverted trapezoid.

In an embodiment of the present disclosure, the two first notches are symmetrically disposed on the two sides of the first protrusion portion.

An embodiment of the present disclosure provides a liquid crystal display. The liquid crystal display includes a backlight module and a liquid crystal display panel disposed opposite to the backlight module. The backlight module includes a support part, a light guide plate positioned in the support part, and a light source. An end of the support part has two first notches and a first protrusion portion, the two first notches are respectively positioned at two sides of the first protrusion portion, a light incident surface of the light guide plate is disposed adjacent to a side surface of the first protrusion portion, a light emitting surface of the light source is attached to the light incident surface, and the light incident surface is disposed opposite to the first protrusion portion. The liquid crystal display panel includes a stepped area and a flexible printed circuit board bound to the stepped area, the stepped area is provided with a plurality of second notches respectively corresponding to positions of the first notches, the stepped area corresponding to a position of the first protrusion portion is provided with a second protrusion portion, the second notches are respectively positioned at two sides of the second protrusion portion, the second notches are provided with a binding area away from an edge of the second protrusion portion, and the flexible printed circuit board is bound to the binding area and sequentially passes through the second notches and the first notches to be bent to a side of the backlight module facing away from the liquid crystal display panel.

In an embodiment of the present disclosure, a vertical projection of the liquid crystal display panel on the backlight module is positioned in the backlight module.

In an embodiment of the present disclosure, a bending apex of the flexible printed circuit board is positioned in one of the first notches.

In an embodiment of the present disclosure, the light incident surface is enclosed to form a recessed notch.

In an embodiment of the present disclosure, the recessed notch is trapezoidal.

In an embodiment of the present disclosure, the light incident surface includes a first light incident surface, a second light incident surface, and an intermediate light incident surface connecting the first light incident surface and the second light incident surface, the first light incident surface and the second light incident surface are oppositely disposed, the intermediate light incident surface is perpendicular to a plane of the light guide plate and parallel to a direction in which the first notch points to the first protrusion portion, an angle between the first light incident surface and the intermediate light incident surface ranges between greater than or equal to 135 degrees and less than 180 degrees, and an angle between the second light incident surface and the intermediate light incident surface ranges between greater than or equal to 135 degrees and less than 180 degrees.

In an embodiment of the present disclosure, the angle between the first light incident surface and the intermediate light incident surface is equal to the angle between the second light incident surface and the intermediate light incident surface.

In an embodiment of the present disclosure, a length of the recessed notch adjacent to a first side of the first protrusion portion along a first direction is equal to a length of the first protrusion portion adjacent to a second side of the recessed notch along the first direction, and the first direction is a direction in which the first notch points to the first protrusion portion.

In an embodiment of the present disclosure, a ratio of a length of the first protrusion portion along the first direction to a vertical distance of two opposite sides of the support part along the first direction ranges between 0.5 and 0.99.

In an embodiment of the present disclosure, the two first notches are symmetrically disposed on the two sides of the first protrusion portion.

In an embodiment of the present disclosure, the liquid crystal display further includes a driving chip disposed in the stepped area and positioned between an edge of the second protrusion portion away from the display area and an edge of the display area adjacent to the second protrusion portion, and the liquid crystal display panel has the display area and the display area is positioned on a side of the stepped area away from the second protrusion portion.

Beneficial effects of the embodiment of the present disclosure are that a backlight module and a liquid crystal display are provided. The backlight module realizes a narrow border of the backlight module by arranging a light source between a first protrusion portion of a support part and a light incident surface of a light guide plate. The backlight module cooperates with the liquid crystal display panel having a second protrusion portion and second notches of a stepped area, and a flexible printed circuit board passes through the second notches of the liquid crystal display panel and the first notches of the backlight module to make the liquid crystal display have a narrow frame and a high screen ratio.

DETAILED DESCRIPTION OF PREFERRED EMBODIMENTS

Figure 1:
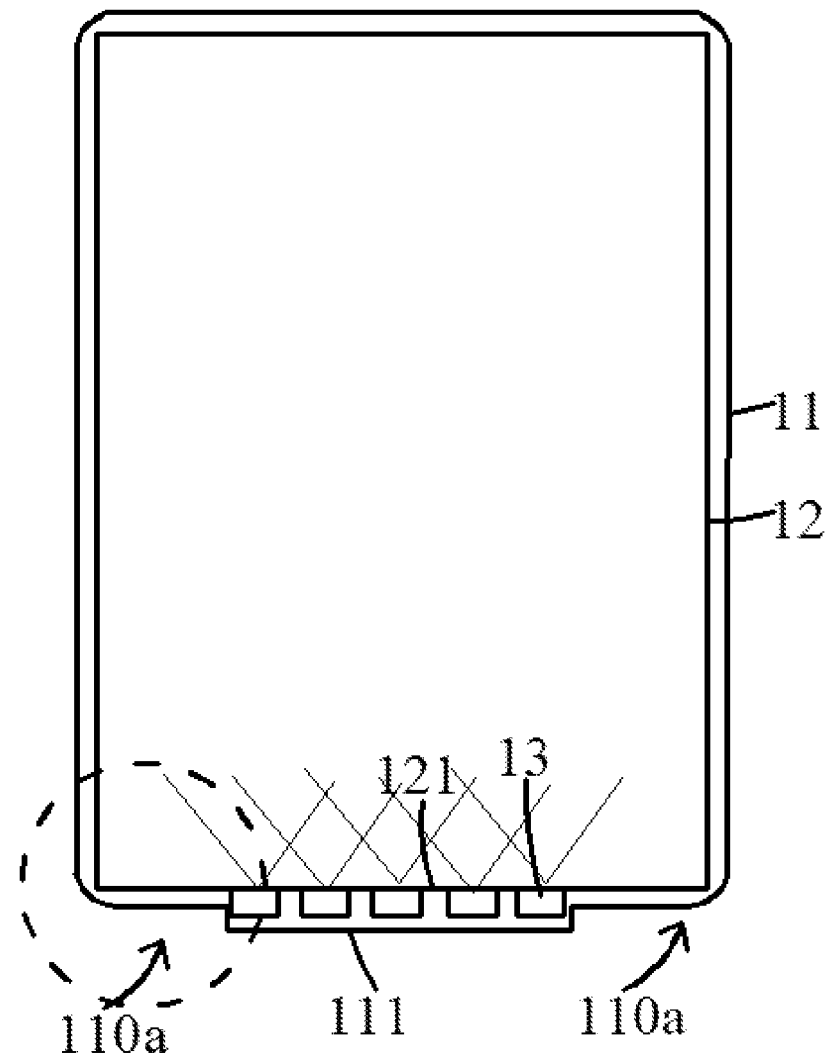
FIG. 1 is a first schematic structural view of a backlight module according to an embodiment of the present disclosure.

Reference characters of drawing are as follows. Support part 11, light guide plate 12, light source 13, first notch 110a, first protrusion portion 111, light incident surface 121, non-light incident surface 122, recessed notch 121a, first light incident surface 1211, second light incident surface 1212, intermediate light incident surface 1213, backlight module 10, liquid crystal display panel 20, flexible printed circuit board 220, second notch 200a, second protrusion portion 211, binding area 210b, display area AA, light emitting area VA, bending apex E, driving chip 230, inclined wiring 240, first connection part 2201, and main body 2202.

Figure 3:
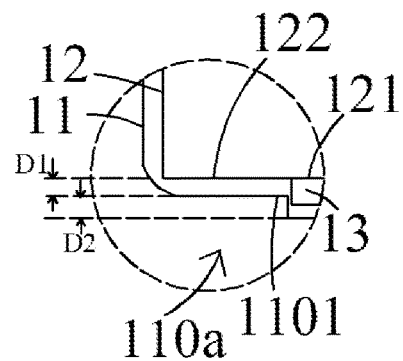
FIG. 3 is a partial enlarged view of the backlight module illustrated in FIG. 1.

Referring to FIG. 3, a partial enlarged view of the backlight module illustrated in FIG. 1 is provided. The light source 13 is not disposed between the non-light incident surface 122 and the first notches 110a near a first plane 1101 of the light guide plate 12, such that vertical distance D1 between the non-light incident surface 122 and the first notches 110a near the first plane 1101 of the light guide plate 12 is decreased, a depth D2 of each of the first notches 110a is increased, thereby enabling the backlight module to achieve a narrow frame.

The backlight module of the embodiment of the present disclosure arranges the light source between the first protrusion portion of the support part and the light incident surface of the light guide plate, and the light source is not disposed between the first notches on both sides of the first protrusion portion and the non-light incident surface of the light guide plate to realize a narrow frame of the backlight module.

The technical solutions in the embodiments of the present disclosure will be clearly and completely described in the following with reference to the accompanying drawings in the embodiments. It is apparent that the described embodiments are only a part of the embodiments of the present disclosure, and not all of them. All other embodiments obtained by those skilled in the art based on the embodiments of the present disclosure without creative efforts are within the scope of the present disclosure.

Referring to FIG. 1, a first schematic structural view of a backlight module according to an embodiment of the present disclosure are provided. The backlight module includes a support part 11, a light guide plate 12, and a light source 13.

An end of the support part 11 has two first notches 110a and a first protrusion portion 111, the two first notches 110a are respectively positioned at two sides of the first protrusion portion 111.

The two first notches 110a are symmetrically disposed on both sides of the first protrusion portion 111, that is, the two first notches 110a are the same size. The first protrusion portion 111 is rectangular. The support part 11 includes a back plate and a plastic frame disposed on the back plate.

Figure 2:
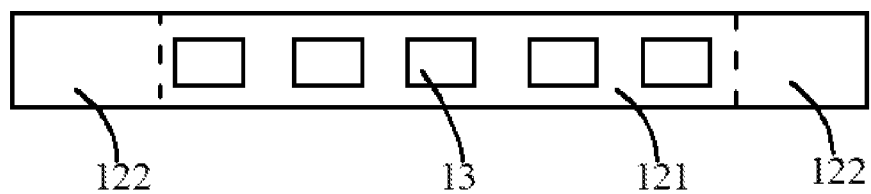
FIG. 2 is a schematic view of a light guide plate of the backlight module near a side of a second protrusion portion illustrated in FIG. 1.

Referring to FIGS. 1 and 2, and FIG. 2 is a schematic view of the light guide plate 12 of the backlight module near a side of the first protrusion portion 111 illustrated in FIG. 1. A light incident surface 121 and a non-light incident surface 122 on both sides of the light incident surface 121 are disposed on a side surface of the light guide plate 12 adjacent to the first protrusion portion 111. The light incident surface 121 is opposite to the first protrusion portion 111. The non-light incident surface 122 is disposed opposite the first notches 110a.

A light emitting surface of the light source 13 is attached to the light incident surface 121, such that the light source 13 is disposed opposite to the first protrusion portion 111. The light source 13 is a light emitting diode.

Figure 4:
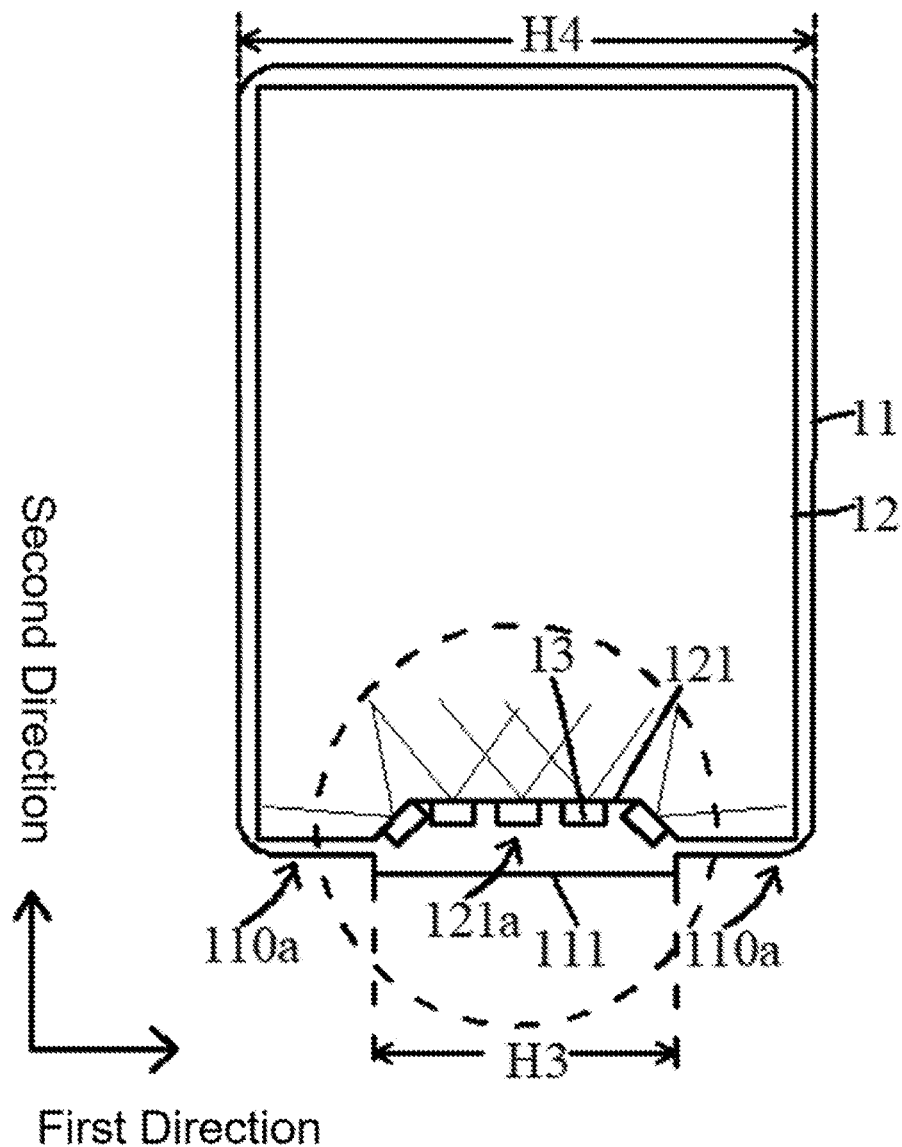
FIG. 4 is a second schematic structural view of a backlight module according to an embodiment of the present disclosure.

Referring to FIG. 4, a second schematic structural view of a backlight module according to an embodiment of the present disclosure is provided. The backlight module illustrated in FIG. 4 is substantially similar to the backlight module illustrated in FIG. 1 except that the light incident surface 121 is formed into a recessed notch 121a. The light incident surface 121 is enclosed to form the recessed notch 121a, such that the light guide plate 12 has incident light on both sides of the recessed notch 121a to improve a light emitting performance of the backlight module.

Figure 5:
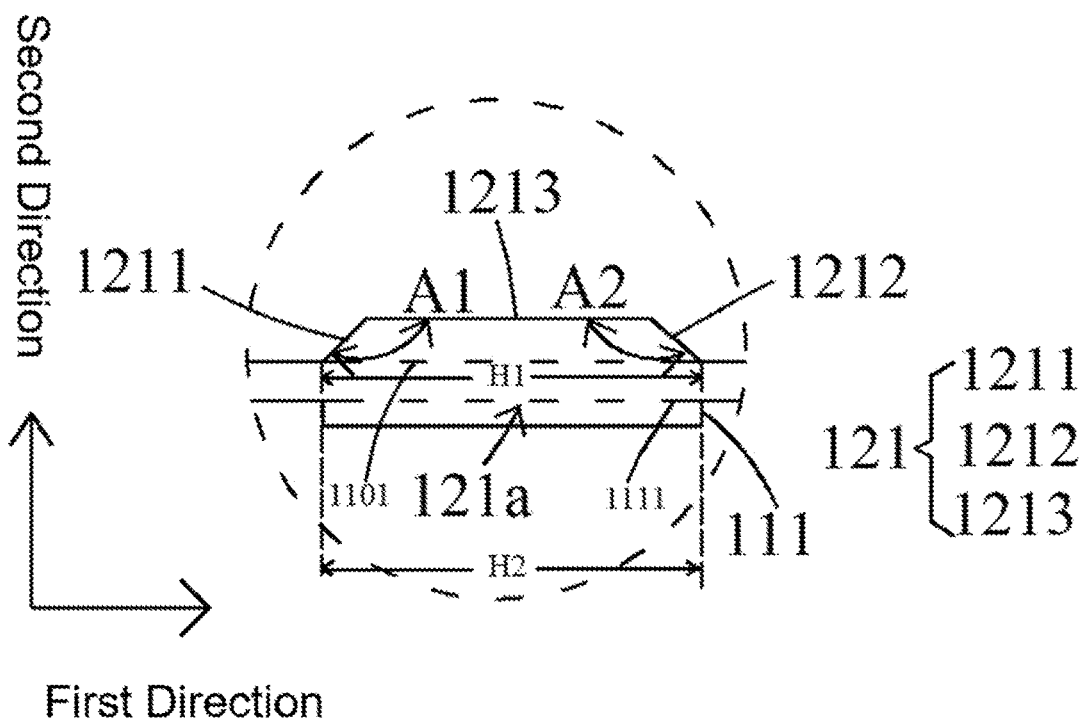
FIG. 5 is a partial enlarged view of the backlight module illustrated in FIG. 4.

Referring to FIG. 5, a partial enlarged view of the backlight module illustrated in FIG. 4 is provided. The recessed notch 121a is trapezoidal. The light incident surface 121 includes a first light incident surface 1211, a second light incident surface 1212, and an intermediate light incident surface 1213 connecting the first light incident surface 1211 and the second light incident surface 1213. The intermediate light incident surface 1213 is perpendicular to a plane of the light guide plate 12 and parallel to a first direction, and the first light incident surface 1211 and the second light incident surface 1212 are oppositely disposed. An angle A1 between the first light incident surface 1211 and the intermediate light incident surface 1213 ranges between greater than or equal to 135 degrees and less than 180 degrees, and an angle A2 between the second light incident surface 1212 and the intermediate light incident surface 1213 ranges between greater than or equal to 135 degrees and less than 180 degrees. When the angle A1 between the first light incident surface 1211 and the intermediate light incident surface 1213 is less than 135 degrees, this causes space occupied by the light source 13 along the second direction to increase, thereby causing a length of the first protrusion portion 111 to be increased along the second direction, and this is not conducive to the backlight module to achieve a narrow frame. When the angle A1 between the first light incident surface 1211 and the intermediate light incident surface 1213 is 180 degrees, the light guide plate 12 has no incident light in an area on both sides of the recessed notch 121a, and a range of the angle between the second light incident surface 1212 and the intermediate light incident surface 1213 is the same as described above. The second direction is a direction in which the first protrusion portion 111 points to the recessed notch 121a, and the first direction is a direction in which the first protrusion portion 111 points to the first notches 110a, and the first direction is coplanar and perpendicular to the second direction.

The first light incident surface 1211, the second light incident surface 1212, and the intermediate light incident surface 1213 are flat planes, such that the light emitting surface of the light source 13 can be closely attached to the light incident surface 121, and the light incident surface 121 and air between the light incident surface 121 and the light source 13 is minimal to avoid loss of light emitted by the light source 13 during propagation in the air.

Further, the angle A1 between the first light incident surface 1211 and the intermediate light incident surface 1213 is equal to the angle A2 between the second light incident surface 1212 and the intermediate light incident surface 1213, such that an amount of incident light incident on the light guide plate 12 adjacent to a side of the first light incident surface 1211 is the same as an amount of incident light incident on the light guide plate 12 adjacent to the second light incident surface 1212, so as to further improve an light output performance of the backlight module.

A length H1 of the recessed notch 121a adjacent to a first side 1101 of the first protrusion portion 111 along the first direction is equal to a length H2 of the first protrusion portion 111 adjacent to a second side 1111 of the recessed notch 121a along the first direction, to make the light incident surface 121 more space available along the first direction, more light sources 13 may be disposed to improve a light emitting performance of the backlight module.

Further, FIG. 4 illustrates that, a ratio of a length H3 of the first protrusion portion 111 along the first direction to a vertical distance H4 of two opposite sides of the support part 11 along the first direction ranges between 0.5 and 0.99 to further increase space available for the light incident surface 121 along the first direction, thereby improving a light emitting performance of the backlight module.

Figure 6:
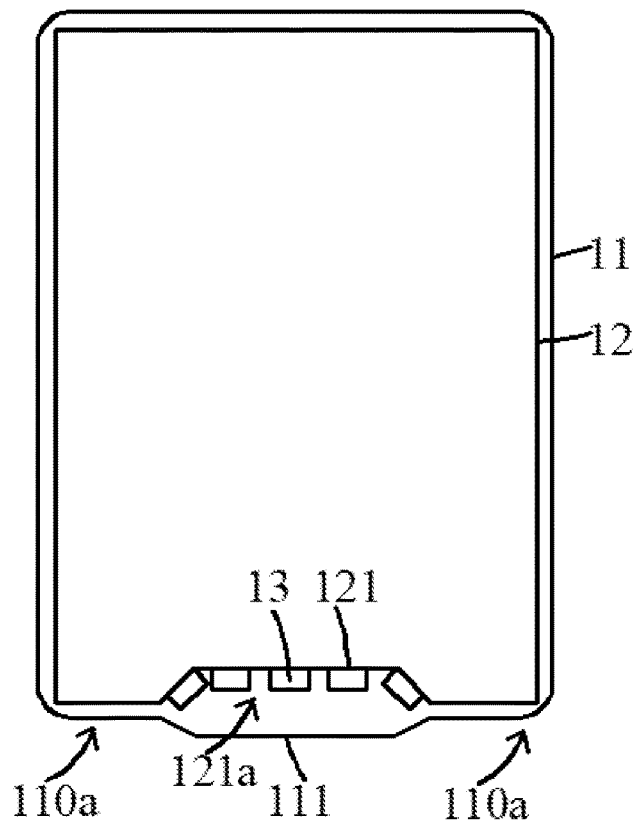
FIG. 6 is a third schematic structural view of a backlight module according to an embodiment of the present disclosure.

Referring to FIG. 6, a third schematic structural view of a backlight module according to an embodiment of the present disclosure is provided. The backlight module illustrated in FIG. 6 is substantially similar to the backlight module illustrated in FIG. 4, except that the first protrusion portion 111 is an inverted trapezoid. The first protrusion portion 111 is inverted trapezoid, such that a size of each of the first notches 110a is larger.

Figure 7:
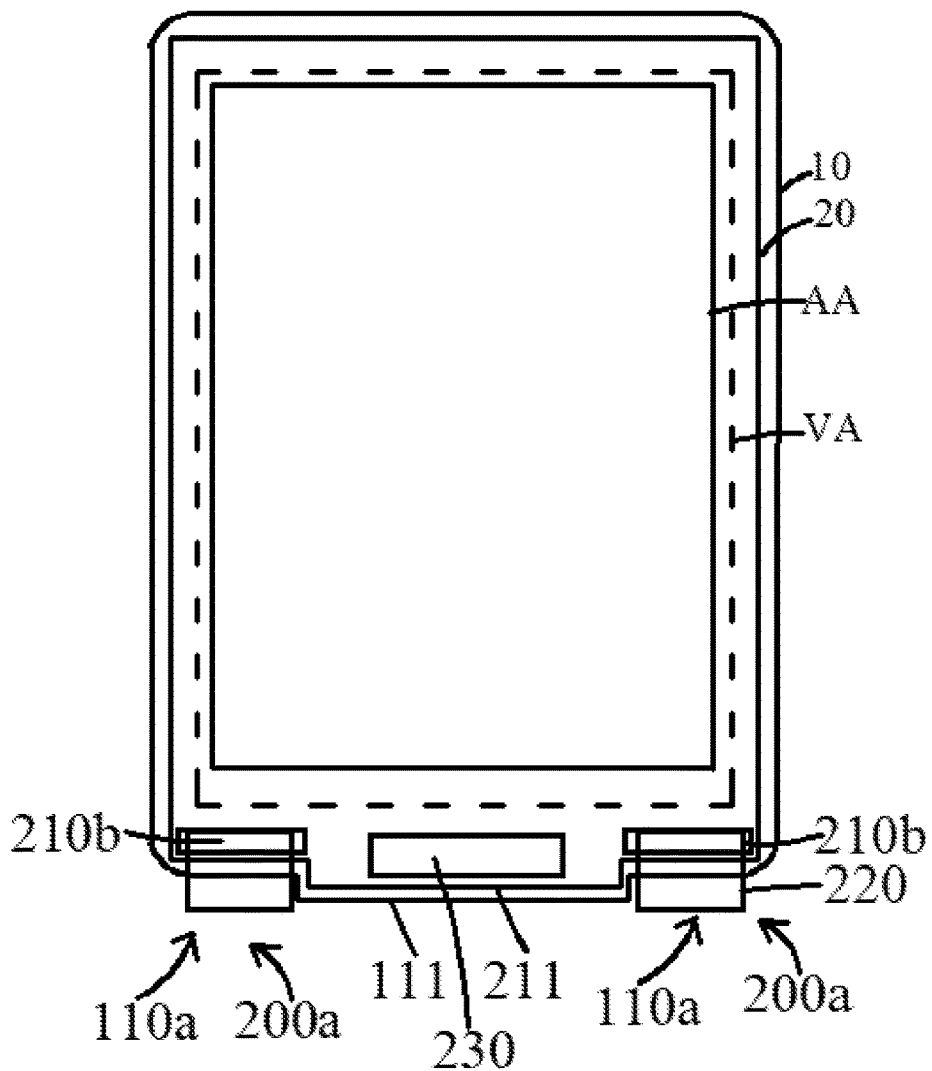
FIG. 7 is a first schematic structural view of a liquid crystal display according to an embodiment of the present disclosure.
Figure 8:
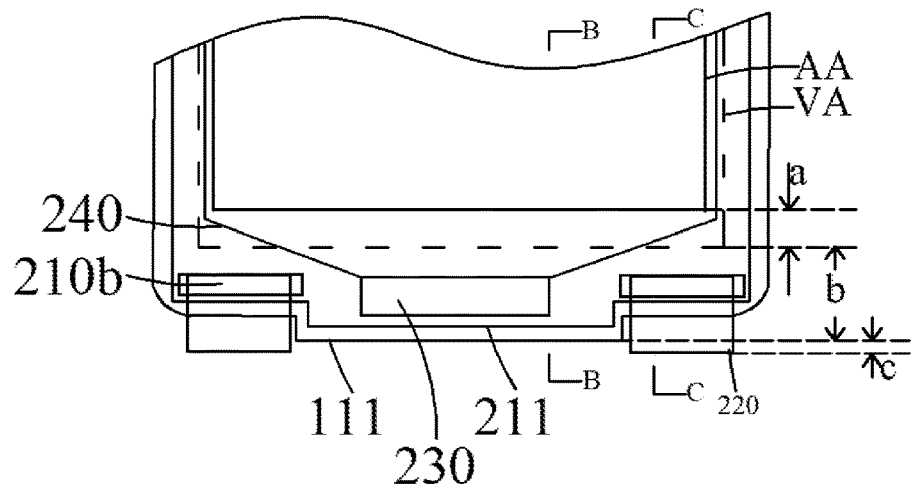
FIG. 8 is a partial enlarged view of the liquid crystal display illustrated in FIG. 7.

Referring to FIGS. 7 and 8, FIG. 7 is a first schematic structural view of a liquid crystal display according to an embodiment of the present disclosure, and FIG. 8 is a partial enlarged view of the liquid crystal display illustrated in FIG. 7. The liquid crystal display includes the backlight module 10 and the liquid crystal display panel 20 as illustrated in FIG. 4.

The liquid crystal display panel 20 includes a stepped area and a flexible printed circuit board 220 bound to the stepped area, the stepped area is provided with a plurality of second notches 200a respectively corresponding to positions of the first notches 110a, the stepped area corresponding to a position of the first protrusion portion 111 is provided with a second protrusion portion 211, the second notches 200a are respectively positioned at two sides of the second protrusion portion 211, two second notches 200a are provided with a binding area 210b away from an edge of the second protrusion portion 211, and two flexible printed circuit boards are bound to the binding area 210b and sequentially passes through the second notches 200a and the first notches 110a to be bent to a side of the backlight module 10 facing away from the liquid crystal display panel 20. The liquid crystal display panel 20 further has a display area AA (that is an active area), and the display area AA is positioned on a side of the stepped area away from the second protrusion portion 211.

It is noted that the backlight module 10 further includes an optical film (not shown) and a light shielding film (not shown), the optical film is positioned on a side of the light emitting surface of the light guide plate, and the optical film includes a brightness enhancement film configured to collect light and a diffusion sheet that makes light uniform. The light shielding film is positioned on a side of the optical film away from the light guide plate, and the light shielding film is used to define a light emitting area VA of the backlight module.

Figure 9:
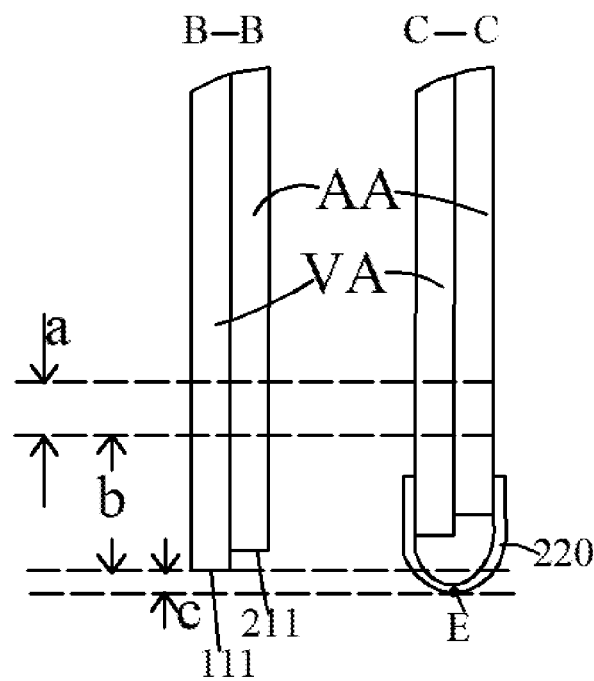
FIG. 9 is a cross sectional view taken along lines B-B and C-C of the liquid crystal display illustrated in FIG. 8.

Referring to FIGS. 8 and 9, FIG. 9 is a cross sectional view taken along lines B-B and C-C of the liquid crystal display illustrated in FIG. 8. A length of a lower frame of the liquid crystal display is a sum of a vertical distance a, a vertical distance b, and a vertical distance c along the second direction (a direction in which the second protrusion portion 211 points to the display area AA). The vertical distance a is a vertical distance from a lower edge of the display area AA of the liquid crystal display panel to a lower edge of the light emitting area VA of the backlight module along the second direction, the vertical distance b is a vertical distance from the lower edge of the light emitting area VA of the backlight module to the lower edge of the backlight module 10 along the second direction (that is an edge of the first protrusion portion away from the light emitting area VA of the backlight module 10), and the vertical distance c is a vertical distance from the lower edge of the backlight module 10 to an edge of the flexible printed circuit board 220 bent away from the first notches 110a along the second direction. The liquid crystal display of the embodiment of the present disclosure reduces the vertical distance c by partially or completely positioning the bending portion of the flexible printed circuit board in the first notches 110a and the second notches 200a, thereby reducing a length of a lower frame of the liquid crystal display.

Further, a bending apex E of the flexible printed circuit board 220 is positioned in one of the first notches 110a to further make the liquid crystal display have a narrow frame and a high screen ratio, and the bending apex E is a point on the bending section of the flexible printed circuit board 220 away from the first raised portion 111.

A vertical projection of the liquid crystal display panel 20 on the backlight module 10 is positioned in the backlight module 10 to enable the backlight module 10 to protect the liquid crystal display panel 20.

Continuing to refer to FIG. 8, the liquid crystal display panel 20 further includes a driving chip 230 disposed in the stepped area and positioned between an edge of the second protrusion portion 211 away from the display area AA and an edge of the display area AA adjacent to the second protrusion portion 111, such that a distance between an edge of the driving chip 230 adjacent to the display area AA and an edge of the display area AA adjacent to the driving chip 230 and a distance between an edge of the driving chip 230 away from the display area AA and an edge of the second protrusion portion 211 away from the display area AA are both increased. When the liquid crystal display realizes a narrow lower frame, there is no possibility that a distance from the driving chip 230 to a cutting line of the array substrate constituting the liquid crystal display panel 20 is too close to cause the driving chip to be pressed and electrical property of the driving chip to be poor. There is also no possibility that the driving chip is too close to the display area to cause a poor sealing of the liquid crystal display panel.

The liquid crystal display panel of the embodiment of the present disclosure further includes peripheral traces extending from both sides of the display area AA to the driving chip 230 to be electrically connected to the driving chip 230. The peripheral traces include inclined wirings 240, in order to make the inclined wirings 240, fan-shaped wirings extending from the display area AA and disposed on metal terminals (not shown) in the binding area 210b have sufficient layout space. A distance between the edge of the driving chip 230 adjacent to the display area AA and the edge of the display area AA adjacent to the driving chip 230 is greater than a distance between the edge of the driving chip 230 away from the display area AA and the edge of the second protrusion portion 211 away from the display area AA. For example, the driving chip 230 is completely or partially positioned on the second protrusion portion 211, or the driving chip 230 is positioned outside the second protrusion portion 211 and positioned in the stepped area.

Figure 10:
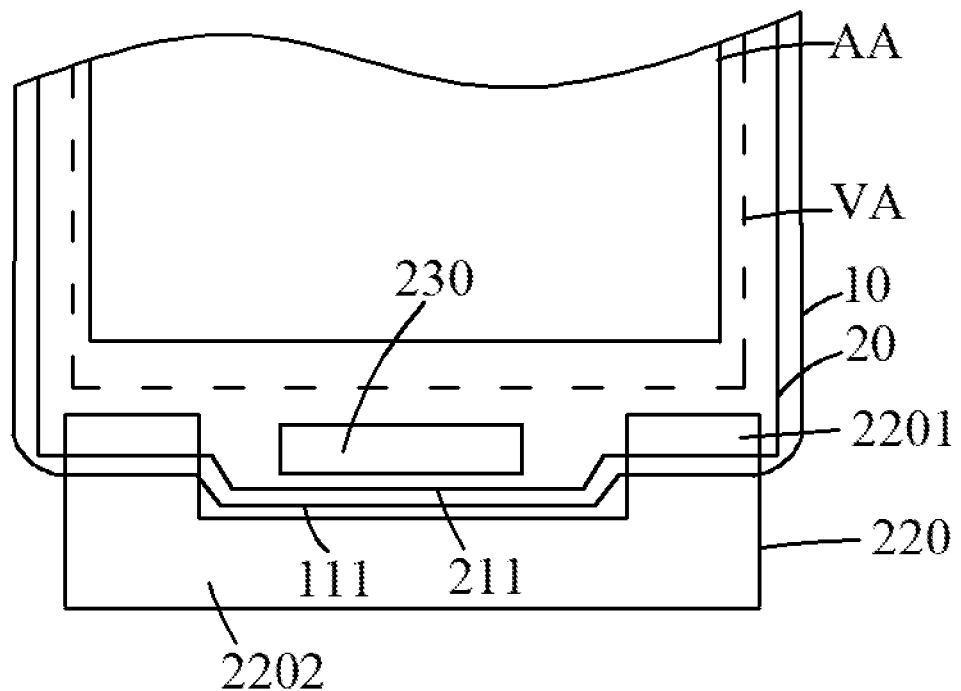
FIG. 10 is a second schematic structural view of a liquid crystal display according to an embodiment of the present disclosure.

Referring to FIG. 10, a second schematic structural view of a liquid crystal display according to an embodiment of the present disclosure is provided. FIG. 10 is different from the liquid crystal display illustrated in FIG. 7 only in that the second protrusion portion 211 and the first protrusion portion 111 are both inverted trapezoids, such that the second notches 200a and the first notches 110a are larger, which is more advantageous for the liquid crystal display to reach a narrow frame and a high screen ratio. The flexible printed circuit board 220 has a notch corresponding to the first protrusion portion 111, the notch is rectangular or trapezoidal, two sides of the notch of the flexible printed circuit board 220 have first connection portions 2201, and two first connection portions 2201 are bound to the binding area 210b and connected to a main body 2202 of the flexible printed circuit board 220 to input signals to the main body 2202.

In the liquid crystal display panel of the embodiment, the liquid crystal display panel having the second protrusion portion and the second notches in the stepped area cooperates with a narrow frame of the backlight module having the first protrusion portion and the first notches, and the flexible printed circuit board sequentially passes through the second notches of the liquid crystal display panel and the first notches of the backlight module, such that the liquid crystal display has a narrow fame and a high screen ratio.

The description of the above embodiments is only for helping to understand the technical solutions of the present disclosure and the core ideas thereof. It is understood by those skilled in the art that the technical solutions described in the foregoing embodiments may be modified, or some of the technical features may be equivalently replaced. The modifications and substitutions do not depart from the scope of the technical solutions of the embodiments of the present disclosure.

What is claimed is:

1. A backlight module, comprising:
a support part;
a light guide plate positioned in the support part; and
a light source;
wherein an end of the support part has two first notches and a first protrusion portion, the two first notches are respectively positioned at two sides of the first protrusion portion, a light incident surface of the light guide plate is disposed adjacent to a side surface of the first protrusion portion, a light emitting surface of the light source is attached to the light incident surface, and the light incident surface is disposed opposite to the first protrusion portion.

2. The backlight module according to claim 1, wherein the light incident surface is enclosed to form a recessed notch.

3. The backlight module according to claim 2, wherein the recessed notch is trapezoidal.

4. The backlight module according to claim 3, wherein the light incident surface comprises a first light incident surface, a second light incident surface, and an intermediate light incident surface connecting the first light incident surface and the second light incident surface, the first light incident surface and the second light incident surface are oppositely disposed, the intermediate light incident surface is perpendicular to a plane of the light guide plate and parallel to a direction in which the first notch points to the first protrusion portion, an angle between the first light incident surface and the intermediate light incident surface ranges between greater than or equal to 135 degrees and less than 180 degrees, and an angle between the second light incident surface and the intermediate light incident surface ranges between greater than or equal to 135 degrees and less than 180 degrees.

5. The backlight module according to claim 4, wherein the angle between the first light incident surface and the intermediate light incident surface is equal to the angle between the second light incident surface and the intermediate light incident surface.

6. The backlight module according to claim 2, wherein a length of the recessed notch adjacent to a first side of the first protrusion portion along a first direction is equal to a length of the first protrusion portion adjacent to a second side of the recessed notch along the first direction, and the first direction is a direction in which the first notch points to the first protrusion portion.

7. The backlight module according to claim 6, wherein a ratio of a length of the first protrusion portion along the first direction to a vertical distance of two opposite sides of the support part along the first direction ranges between 0.5 and 0.99.

8. The backlight module according to claim 7, wherein the first protrusion portion is an inverted trapezoid.

9. The backlight module according to claim 1, wherein the two first notches are symmetrically disposed on the two sides of the first protrusion portion.

10. A liquid crystal display, comprising:
a backlight module; and
a liquid crystal display panel disposed opposite to the backlight module;
the backlight module comprising:
a support part;
a light guide plate positioned in the support part; and
a light source;
wherein an end of the support part has two first notches and a first protrusion portion, the two first notches are respectively positioned at two sides of the first protrusion portion, a light incident surface of the light guide plate is disposed adjacent to a side surface of the first protrusion portion, a light emitting surface of the light source is attached to the light incident surface, and the light incident surface is disposed opposite to the first protrusion portion; and
wherein the liquid crystal display panel comprises a stepped area and a flexible printed circuit board bound to the stepped area, the stepped area is provided with a plurality of second notches respectively corresponding to positions of the first notches, the stepped area corresponding to a position of the first protrusion portion is provided with a second protrusion portion, the second notches are respectively positioned at two sides of the second protrusion portion, the second notches are provided with a binding area away from an edge of the second protrusion portion, and the flexible printed circuit board is bound to the binding area and sequentially passes through the second notches and the first notches to be bent to a side of the backlight module facing away from the liquid crystal display panel.

11. The liquid crystal display according to claim 10, wherein a vertical projection of the liquid crystal display panel on the backlight module is positioned in the backlight module.

12. The liquid crystal display according to claim 10, wherein a bending apex of the flexible printed circuit board is positioned in one of the first notches.

13. The liquid crystal display according to claim 10, wherein the light incident surface is enclosed to form a recessed notch.

14. The liquid crystal display according to claim 13, wherein the recessed notch is trapezoidal.

15. The liquid crystal display according to claim 14, wherein the light incident surface comprises a first light incident surface, a second light incident surface, and an intermediate light incident surface connecting the first light incident surface and the second light incident surface, the first light incident surface and the second light incident surface are oppositely disposed, the intermediate light incident surface is perpendicular to a plane of the light guide plate and parallel to a direction in which the first notch points to the first protrusion portion, an angle between the first light incident surface and the intermediate light incident surface ranges between greater than or equal to 135 degrees and less than 180 degrees, and an angle between the second light incident surface and the intermediate light incident surface ranges between greater than or equal to 135 degrees and less than 180 degrees.

16. The liquid crystal display according to claim 15, wherein the angle between the first light incident surface and the intermediate light incident surface is equal to the angle between the second light incident surface and the intermediate light incident surface.

17. The liquid crystal display according to claim 13, wherein a length of the recessed notch adjacent to a first side of the first protrusion portion along a first direction is equal to a length of the first protrusion portion adjacent to a second side of the recessed notch along the first direction, and the first direction is a direction in which the first notch points to the first protrusion portion.

18. The liquid crystal display according to claim 17, wherein a ratio of a length of the first protrusion portion along the first direction to a vertical distance of two opposite sides of the support part along the first direction ranges between 0.5 and 0.99.

19. The liquid crystal display according to claim 10, wherein the two first notches are symmetrically disposed on the two sides of the first protrusion portion.

20. The liquid crystal display according to claim 10, further comprising a driving chip disposed in the stepped area and positioned between an edge of the second protrusion portion away from the display area and an edge of the display area adjacent to the second protrusion portion, wherein the liquid crystal display panel has the display area and the display area is positioned on a side of the stepped area away from the second protrusion portion.

* * * * *